United States Patent
Hsu et al.

(10) Patent No.: US 9,441,714 B2
(45) Date of Patent: Sep. 13, 2016

(54) JACKING DEVICE

(75) Inventors: An Szu Hsu, Taipei (TW); Chien Cheng Mai, Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 1036 days.

(21) Appl. No.: 13/586,006

(22) Filed: Aug. 15, 2012

(65) Prior Publication Data

US 2013/0220043 A1    Aug. 29, 2013

(30) Foreign Application Priority Data

Feb. 29, 2012 (TW) .............................. 101203509 U

(51) Int. Cl.
*F16H 21/44* (2006.01)
*G06F 1/16* (2006.01)

(52) U.S. Cl.
CPC .............. *F16H 21/44* (2013.01); *G06F 1/1616* (2013.01); *Y10T 74/18912* (2015.01)

(58) Field of Classification Search
CPC . E05D 2015/485; E05D 15/42; E05D 15/36; E05D 3/18
USPC .............................................. 74/101; 16/352
See application file for complete search history.

(56) References Cited

U.S. PATENT DOCUMENTS

| | | | | |
|---|---|---|---|---|
| 1,838,898 A * | 12/1931 | Aldeen | ............... | E05D 3/18 16/289 |
| 7,283,355 B2 * | 10/2007 | Han | ............... | G06F 1/162 248/917 |
| 7,586,743 B2 * | 9/2009 | Lin | ............... | G06F 1/1616 361/679.55 |
| 8,434,265 B1 * | 5/2013 | Campbell | ............... | E05D 15/30 16/195 |
| 8,654,520 B2 * | 2/2014 | Lin | ............... | G06F 1/1624 361/679.02 |
| 2005/0139740 A1 * | 6/2005 | Chen | ............... | F16M 11/10 248/286.1 |
| 2005/0168499 A1 * | 8/2005 | Williams | ............... | G06F 1/16 361/679.11 |
| 2006/0077622 A1 * | 4/2006 | Keely | ............... | G06F 1/16 361/679.09 |
| 2007/0030634 A1 * | 2/2007 | Maskatia | ............... | G06F 1/1616 361/679.27 |
| 2008/0304215 A1 * | 12/2008 | Chiu | ............... | G06F 1/1616 361/679.27 |
| 2009/0044377 A1 * | 2/2009 | Liang | ............... | E05D 7/0415 16/354 |
| 2010/0043174 A1 * | 2/2010 | Bestle | ............... | G06F 1/1616 16/303 |
| 2011/0023272 A1 * | 2/2011 | Huang | ............... | E05D 3/18 16/362 |
| 2011/0107678 A1 * | 5/2011 | Bauman | ............... | E05D 15/30 49/506 |

FOREIGN PATENT DOCUMENTS

GB         2003971 A  *  3/1979

* cited by examiner

*Primary Examiner* — William C Joyce
*Assistant Examiner* — Randell J Krug
(74) *Attorney, Agent, or Firm* — Rosenberg, Klein & Lee

(57) ABSTRACT

A jacking device is provided to push an object for rotation and upward or downward movement. The jacking device includes a combination of a slave arm and a link arm. The slave arm includes a first end capable of producing rotation and linear movement and a second end pivoted to the link arm. The link arm includes a fixation end disposed on a base and a free end. When the first end of the slave arm is received with an action force, the second end of the slave arm is forced to push the link arm for rotation, and the free end of the link arm is forced to motion between a first position and a second position so as to push an object for rotation and upward or downward movement.

33 Claims, 9 Drawing Sheets

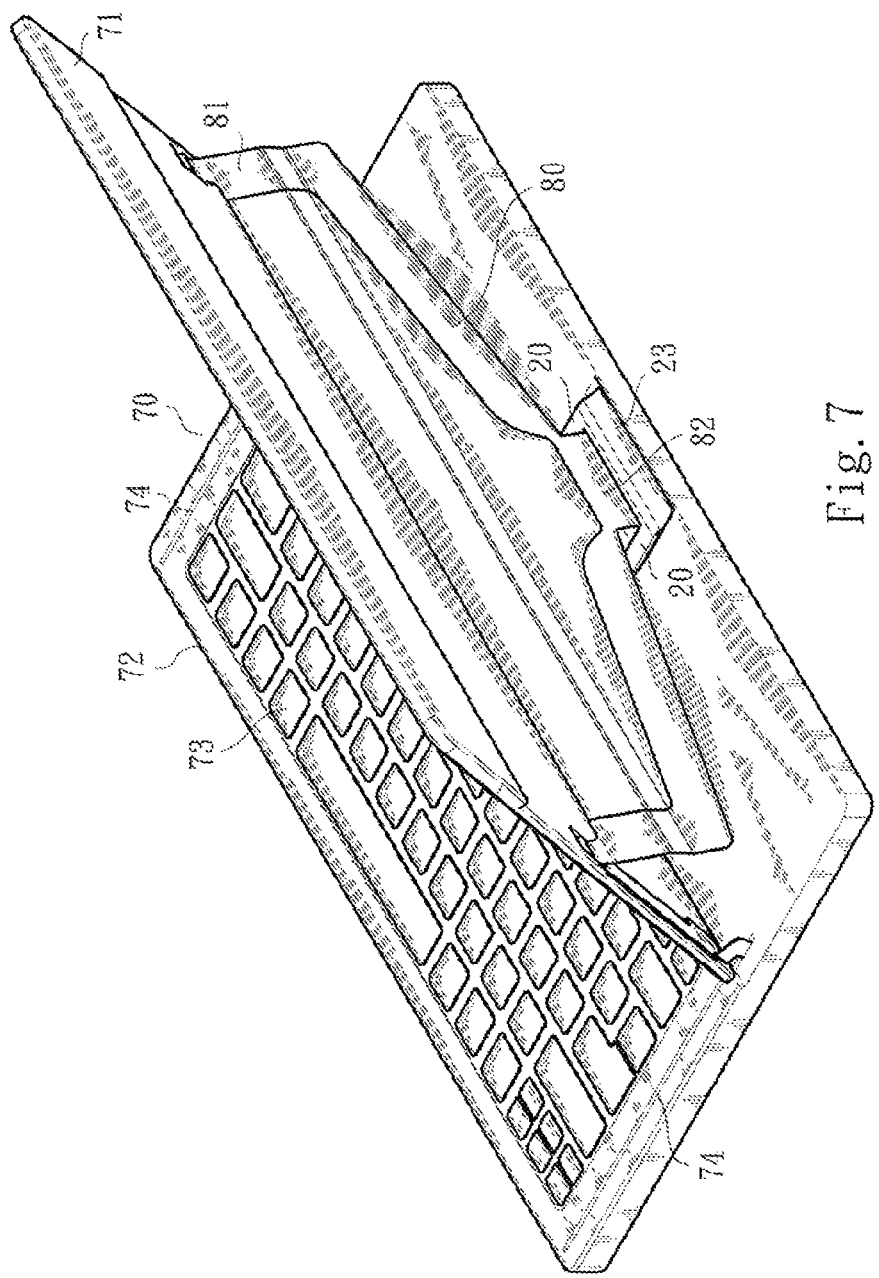

JACKING DEVICE

BACKGROUND OF THE INVENTION

1. Field of the Invention

The present invention relates to a jacking device, in particular relates to a jacking device utilizing an assembly of a slave arm and a link arm to assist a machine body or module in producing rotation and upward or downward movement.

2. Description of the Related Art

Devices applied with oil hydraulic systems or mechanical components (e.g., screws, gears, transmission motors, etc) to jack up or lift and lower an object are known as conventionally skills, such as jacks and jacking machines which are known as typical cases.

One topic related to structure designs and applications of the above-described conventional skills is that complicate structure assembly and operation conditions inherent therein are not our expectations.

It can be understood that these conventional skills generally can be simply applied to lift and lower objects due to complicate structure assembly thereof. Accordingly, it reflects that there will be a difficult topic to assist an object or a machine body (e.g., electric apparatuses, mechanical apparatus, etc.) in producing motion or even labor-saving motion, when these conventional skills are assembled with and applied to the objects and machine bodies.

Representatively speaking, the disclosures of the above-mentioned reference data reveal the conditions of usage and structural design of these jacking devices or the components connected therewith. If the structure and above-described applications of these jacking devices and the components connected therewith can be properly redesigned and reconsidered, the use pattern of the jacking devices can be advancedly altered, thus to be distinguished from conventional products and methods. The following exemplary topics related to the structure design of a jacking device shall be at least considered.

Firstly, the structure assembly of a jacking device shall be possibly simplified, so as to improve conductions such as complicate structure and operation in conventional skills.

Secondly, the structure design of a jacking device can be served as an auxiliary device to be conveniently assembled with and applied to other objects or machine bodies, thereby assisting the motions of the objects or machine bodies and increasing the range of application thereof. It is actually that the conditions of conventional skills which are incapable of being assembled with and applied to other objects or machine bodies can be improved accordingly.

However, the above-described topics do not physically taught or implied in the cited reference data.

BRIEF SUMMARY OF THE INVENTION

In view of this, the purpose of the present invention is to provide a jacking device provided to push an object for rotation and upward or downward movement. The jacking device includes a combination of a slave arm and a link arm. The slave arm includes a first end capable of producing rotation and linear movement and a second end pivoted to the link arm. The link arm includes a fixation end disposed on a base and a free end. When the first end of the slave arm is received with an action force, the second end of the slave arm is forced to push the link arm for rotation, and the free end of the link arm is forced to motion between a first position and a second position so as to push an object for rotation and upward or downward movement.

According to the jacking device of the present invention, an elastic device is configured between the first end of the slave arm and the fixation end of the link arm. The elastic device stores energy therein when the first end of the slave arm is motioned in response to the applied action force, thus to motion the free end of the link arm from the first position toward the second position. In addition, when the applied action force is removed, the energy stored in the elastic device is released therefrom to drive the slave arm and the link arm back to their initial position.

According to the jacking device of the present invention, the first end of the slave arm is disposed on the base, and the first end of the slave arm is pivoted to a machine body (or slide/rotating module). When, the machine body is motioned, an action, force is therefore generated to force the first end of die slave arm to have linear movement on a reference axis, and the second end of the slave arm is forced to push the link arm from the first position toward the second position, so that the machine body is pushed to produce rotation or upward movement.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein;

FIG. 7 is a schematic view of an embodiment of the present invention which is assembled with and applied to a machine body, illustrating a condition of a support arm configured between a moving module and a system module of the machine body;

DETAILED DESCRIPTION OF THE INVENTION

Figure 1:
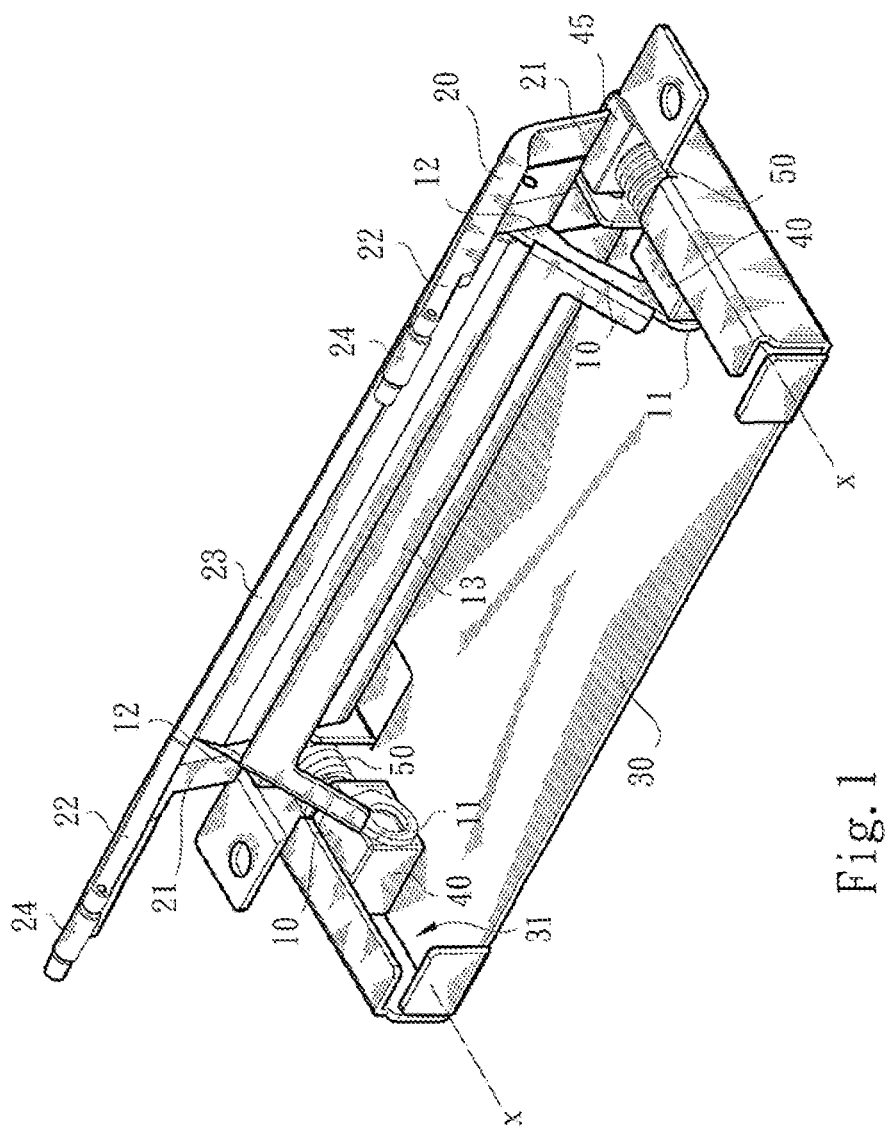
FIG. 1 is a schematic view of a structure of an embodiment of the present invention combined with a base, in which an arrangement relationship of a slave arm, a link arm and the base is illustrated.
Figure 2:
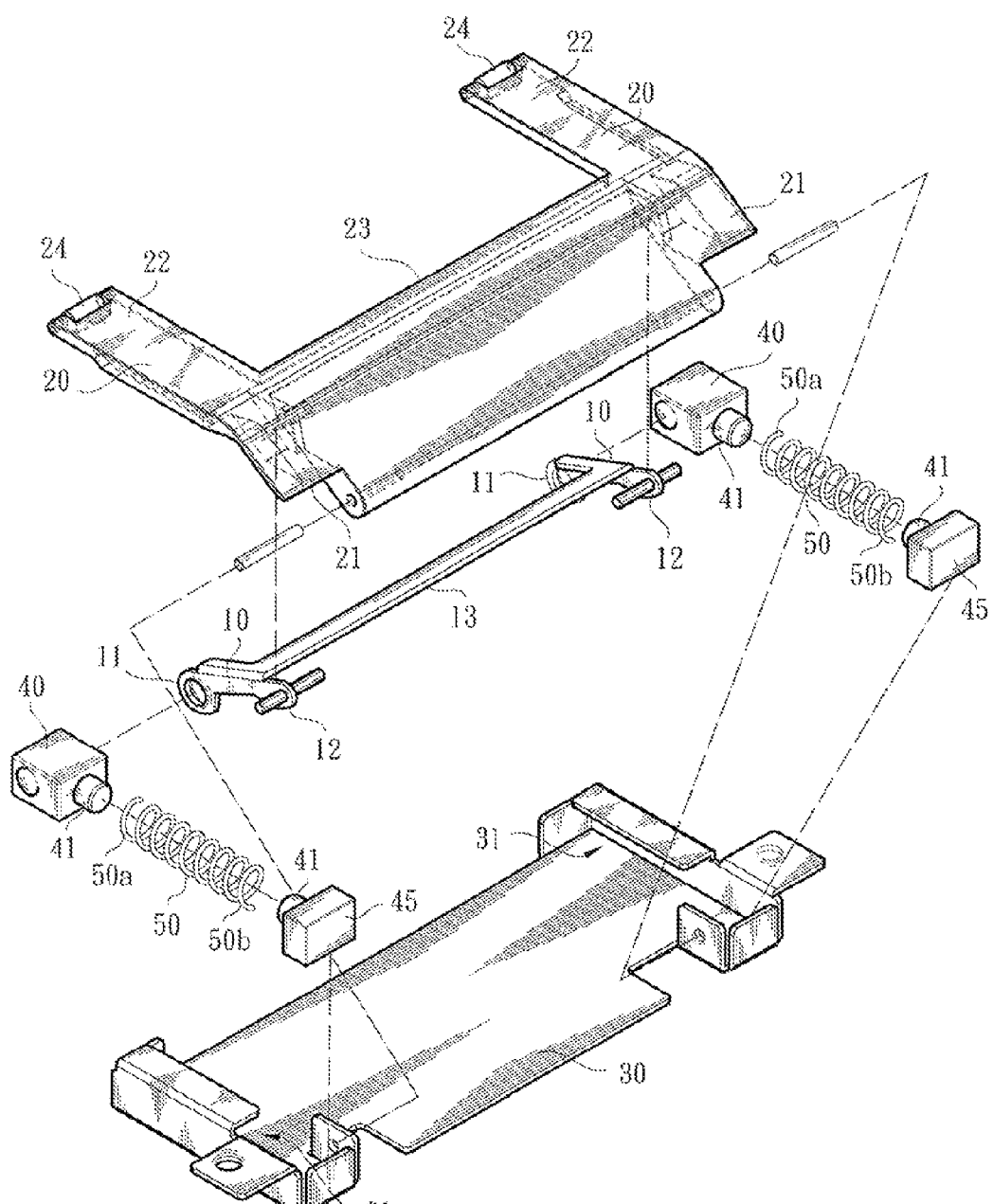
FIG. 2 is an exploded schematic view of the structure of FIG. 1.
Figure 3:
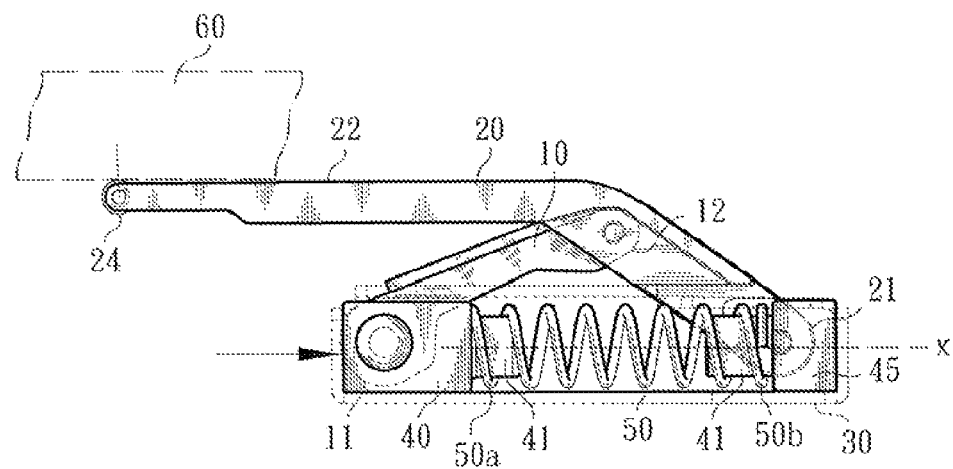
FIG. 3 is a schematic view of a plane structure of the present invention.

Referring to FIGS. 1, 2 and 3, a jacking device of the present invention comprises a combination of a slave arm and a link arm, in which the slave arm and the link arm are generally denoted by reference numbers 10 and 20, respectively. The slave arm 10 formed by type of a rod-like article or plate-like article comprises a first end 11 and a second end 12 pivoted to the link arm 20. In FIGS. 1 and 2, it is appeared that the first end 11 of the slave arm 10 is rotatable and linearly motioned (or shifted) along a (horizontal) reference axis x.

FIGS. 1 and 2 also illustrate that the link arm 20 formed by type of a rod-like article or plate-like article comprises a fixation end 21 and a free end 22, wherein, the second end 12 of the slave arm 10 is rotatably pivoted at a position located between the fixation end 21 and the free end 22 of the link arm 20. Concretely speaking, the second end 12 of the slave arm 10 is pivoted at a position to be close to the fixation end 21 of the link arm 20. That is, a distance which is measured from a pivot position of the second end 12 of the slave arm 10 and the link arm 20 to the fixation end 21 of the link arm 20 is approximately equal to one-third of a length of the link arm 20 (e.g., the condition shown in FIG. 3).

Accordingly, when the first end 11 of the slave arm 10 is received with an external force or action force, the second end 12 of the slave arm 10 is forced to push the link arm 20 for rotation by taking the fixation end 21 thereof as a spindle pivot, and the free end 22 of the link arm 20 is forced to motion between a first position and a second position so as to push an object for rotation and upward or downward movement. The related contents will be described in detail hereinafter.

In the adopted embodiment, the first end 31 of the slave arm 10 and the fixation end 21 of the link arm 20 are disposed on a base 30. The base 30 is configured with a rail 31 along which the first end 11 of the slave arm 10 is motioned, i.e., the first end 11 of the slave arm 10 is capable of moving and rotating along the rail 31 of the base 30. In the adopted embodiment, the first end 11 of the slave arm 10 is rotatably disposed on a slide portion 40, and the slide portion 40 is freely movably installed in the rail 31 of the base 30. An external force or action force is allowed to push the slide portion 40, enabling the slide portion 40 to drive the first end 11 of the slave arm 10 to move and rotate along the rail 31 of the base 30.

In FIGS. 1 and 2, it is appeared that the slave arm 10 formed by type of symmetry comprises a connecting portion 13 connected between two slave arms 10, and also the link arm 20 formed by type of symmetry comprises a connecting portion 23 connected between two link arms 20. In accordance with the (symmetrical) types of the slave arms 10 and the link arms 20, the base 30 is correspondingly configured with a rail 31 formed by type of symmetry.

Referring again to FIGS. 1, 2 and 3, in this preferred embodiment, an elastic device 50 is configured between the first end 11 of the slave arm 10 and the fixation end 21 of the link arm 20. The elastic device 50 located at the first end 11 of the slave arm 10 stores energy therein when the first end 11 of the slave arm 10 is motioned in response to the applied action force, thus to motion the free end 22 of the link arm 20 from the first, position toward the second position. In addition, when the action force applied on the first end 11 of the slave arm 10 is removed, the energy stored in the elastic device 50 is released therefrom to drive the slave arm 10 and the link arm 20 back to their initial position.

In the adopted embodiment, the elastic device 50 is selectively formed by type of a helical spring, comprising two ends 50a and 50b respectively fixed at positions which are located between the first end 11 of the slave arm 10 and the fixation end 21 of the link arm 20. Specifically speaking, the first end 11 of the slave arm 10 is pivoted to a slide portion 40 provided with a head end 41, the fixation end 21 of the link arm 20 is configured with a fixation portion 45 provided with another head end 41 thereon, and the two ends 50a and 50b of the elastic device 50 are respectively fixed on the head end 41 of the slide portion 40 and the head end 41 of the fixation portion 45.

Figure 4:
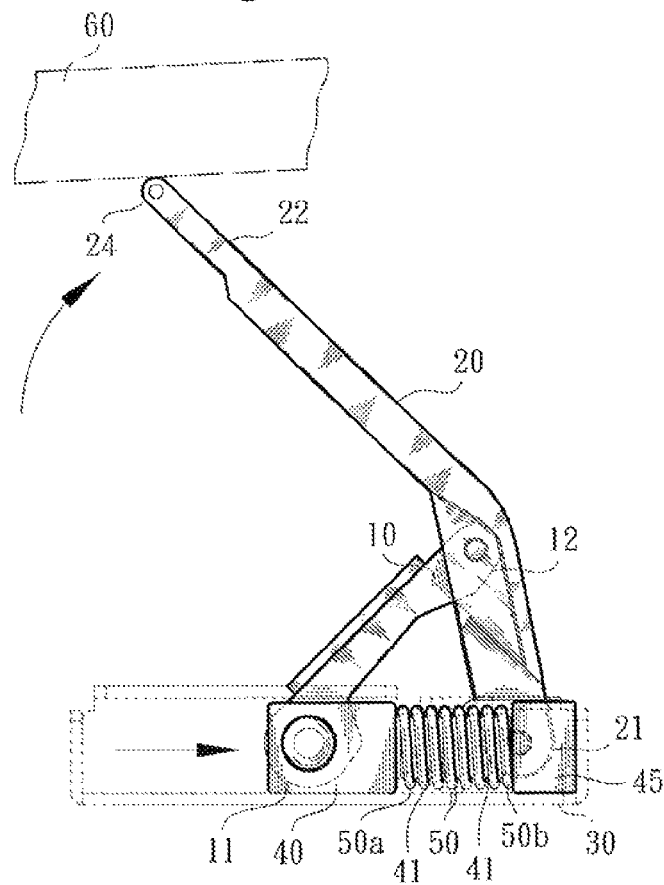
FIG. 4 is a schematic view of an operative embodiment of FIG. 3, illustrating a movement condition of a slave arm, a link arm and an elastic device when an action force is applied.

Referring to FIGS. 3 and 4, a movement condition of the slave arm 10, the link arm 20 and the elastic device 50 is illustrated. The position of the slave arm 10 and the link arm 20 illustrated in FIG. 3 is defined as a first position or an initial position, and the position of the slave arm 10 and the link arm 20 illustrated in FIG. 4 is defined as a second position.

When the external force or the action force (as shown by arrows in FIGS. 3 and 4) is acted on the slide portion 40 or the first end 11 of the slave arm 10, the slide portion 40 and the first end 11 of the slave arm 10 are shifted along the rail 31 of die base 30 or the reference axis x (in FIG. 3) to force the elastic device 50 to store energy therein, and the second end 12 of the slave arm 10 is forced to push the link arm 20 to be rotated from the first position toward the second position by taking the fixation end 21 thereof as a spindle pivot, as the condition illustrated in FIG. 4.

In FIGS. 3 and 4, a condition of an object 60 (marked by imaginary lines) disposed on the free end 22 of the link arm 20 is illustrated. Accordingly, when the link arm 20 is motioned from the first position toward the second position, the object 60 is pushed, or lifted by the free end 22 of the link arm 20 for upward movement, in an executable embodiment, the free end 22 of the link arm 20 is configured with a roller 24, thus to reduce resistance or frictional force formed between the link arm 20 and the object 60.

It can be understood that the weight of the object 60 drives the link arm 20 and the slave arm 10 back to their initial position when the applied external force or action force is removed. In a preferred consideration, with the energy released from the elastic device 50, the slide portion 40 is forced to drive the slave arm 10 to drive the link arm 20 back to their initial position (e.g., the position illustrated in FIG. 3).

Figure 5:
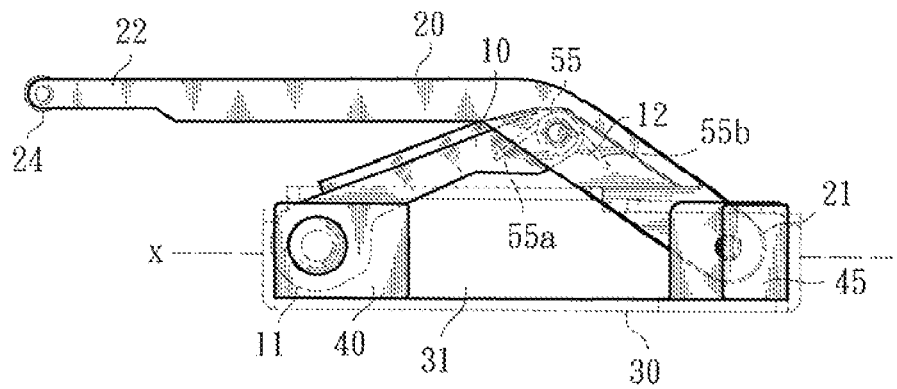
FIG. 5 is a schematic view of a modified embodiment, illustrating a condition of art elastic device configured between a second end of a slave arm and a link arm.
Figure 6:
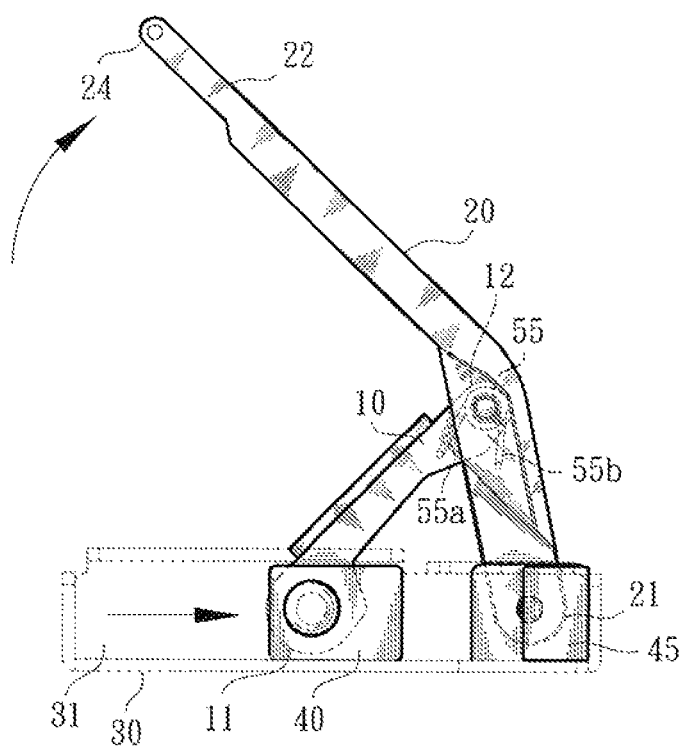
FIG. 6 is a schematic view of an operative embodiment of FIG. 5, illustrating a condition of the elastic device stored with energy therein when the slave arm is motioned from a first position toward a second position.

Referring to FIGS. 5 and 6, an elastic device in a modified embodiment is illustrated, generally denoted by a reference number 55. The elastic device 55 selectively formed by type of a torsion spring is configured at a pivot position of the second end 12 of the slave arm 10 and the link arm 20. The elastic device 55 includes two ends 55a and 55b which are fixed on the second end 12 of the slave arm 10 and the link arm 20, respectively. Accordingly, when the first end 11 of the slave arm 10 is motioned in response to an external force or action force which is applied (as shown by arrows in FIG. 6), the second end 12 of the slave arm 10 is forced to push the link arm 20, so that the slave arm 10 and the link arm 20 are rotated by taking a pivot position therebetween as a spindle pivot, thus to force the elastic device to store energy therein. If the applied action force is removed, the energy released from the elastic device 55 drives the slave arm 10 and the link arm 20 back to their initial position.

Figure 5A:
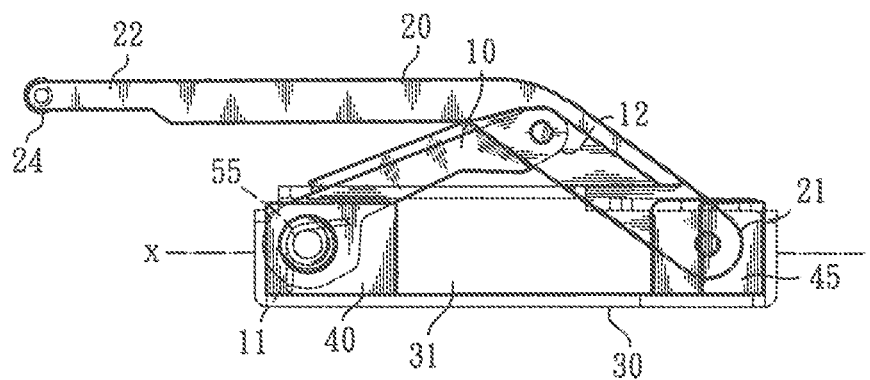
FIG. 5A is a schematic view of a modified embodiment of the present system illustrating an elastic device configured between the first end of the slave arm and a slide portion.
Figure 5B:
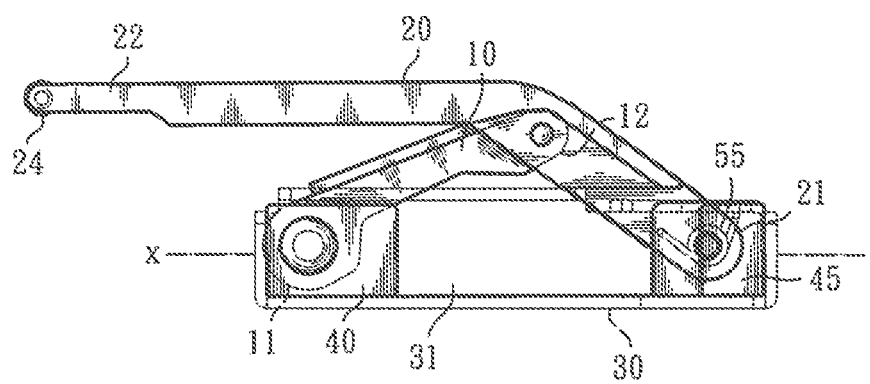
FIG. 5B is a schematic view of a modified embodiment of the present system illustrating a condition of an elastic device configured between a fixation end of the link arm and a fixation portion.

Referring to FIGS. 5A and 5B, in a derivate embodiment, the elastic device 55 can be configured at a position located between the first end 11 of the slave arm 10 and a slide portion 40 (or the base 30, the rail 31 of the base 30), or the elastic device 55 can be configured at a position located between the fixation end 21 of the link arm 20 and a fixation portion 45 (or the base 30). In this derivate embodiment, the elastic device 55 stores energy therein when the slave arm 10 and the link arm 20 are motioned from the first position toward the second position. When the applied action force is removed, the energy released from the elastic device 55 drives the slave arm 10 and the link arm 20 back to their initial position.

Figure 8:
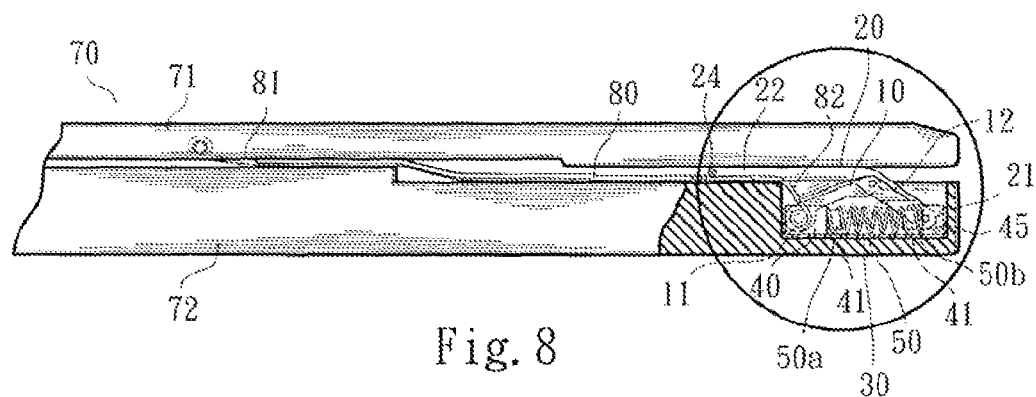
FIG. 8 is a sectional schematic view of a partial structure of the present invention which is assembled with and applied to a machine body, illustrating a combination condition of a slave arm and a support arm.
Figure 9:
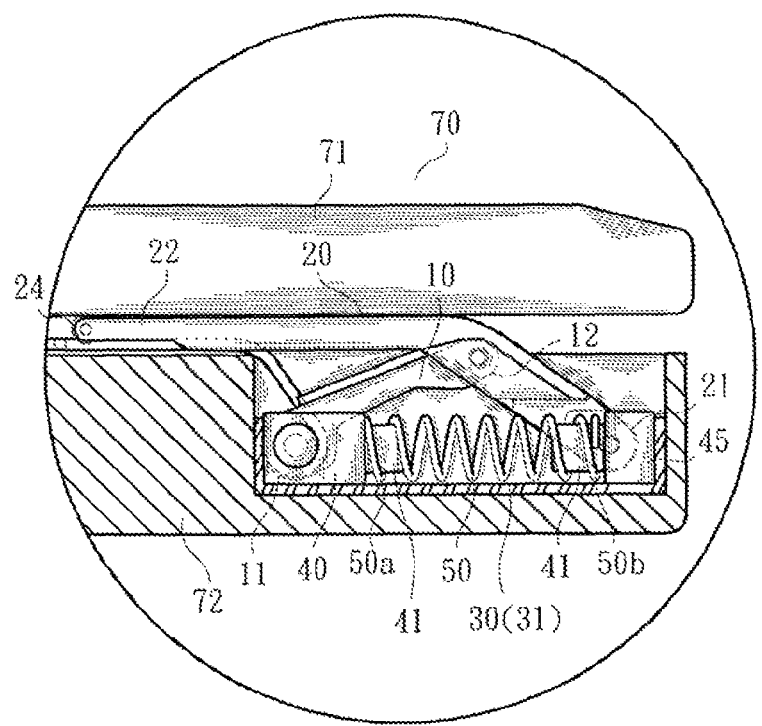
FIG. 9 is an enlarged schematic view of a partial structure of FIG. 8.

Referring to FIGS. 7, 8 and 9, a condition of the slave arm 10 and the link arm 20 of the jacking device to be assembled with and applied to a machine body 70 is illustrated. The machine body 70 is selectively formed by type of an electric apparatus such as a portable computer, comprising a moving module 71 (e.g., a slide cover or a display screen) and a system module 72 provided with a keyboard zone 73, in which the moving module 71 is motionable on the system module 72, i.e., the moving module 71 is movable and rotatable along a groove track 74 disposed on the system module 72.

In an executable embodiment, wherein the base 30 (the rail 31 of the base 30) are arranged on a system module 72. A support arm 80 is configured or assembled between the moving module 71 and the system module 72. In the adopted embodiment the support arm 80 comprises a first end 81 rotatably pivoted on a side region of the moving module 71 and a second end 82 rotatably pivoted on the system module 72.

Concretely speaking, the second end 82 of the support arm 80 and the first end 11 of the slave arm 10 are formed by type of connection, so that power generated from the moving module 71 can be transmitted to the first end 11 of the slave arm 10. In an adopted embodiment, the second end 82 of the support arm 80 and the first end 11 of the slave arm 10 are formed by type of coaxial pivot.

Figure 10:
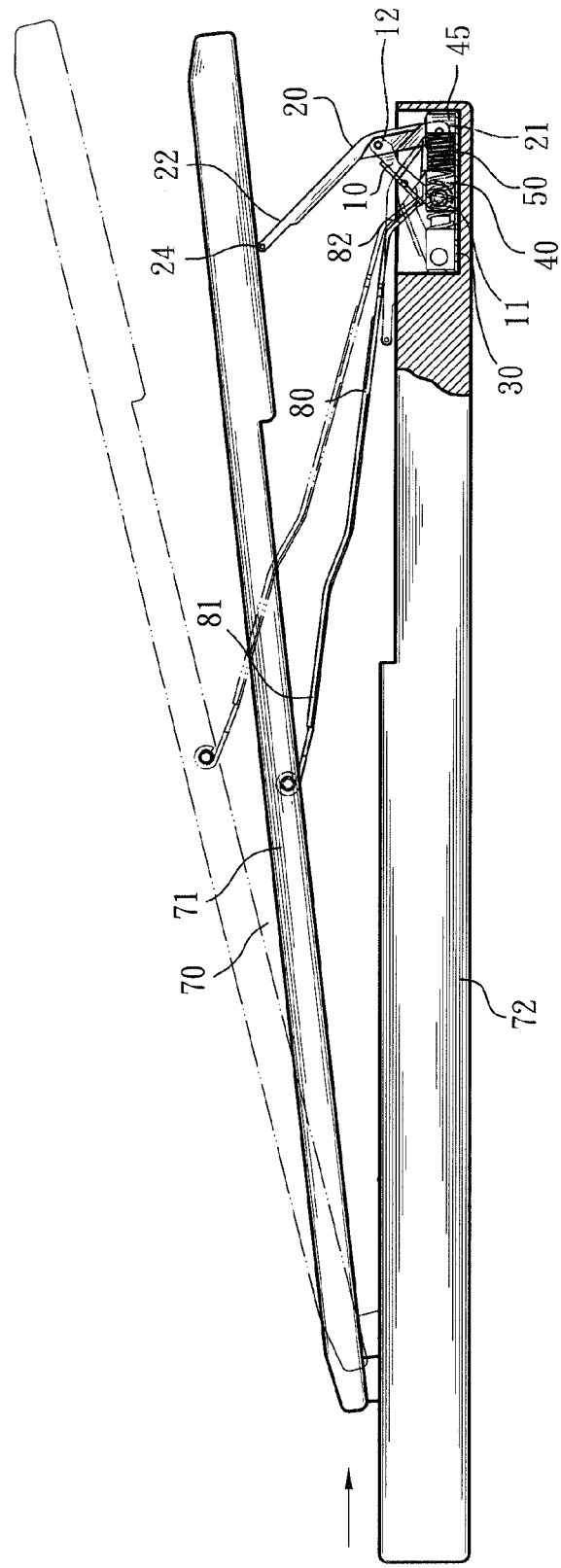
FIG. 10 is a schematic view of an operative embodiment of the present invention which is assembled with and applied to a machine body, illustrating a condition that, when an operator pushing a moving module to cause a support arm to apply force on a slave arm, a link arm is forced to motion toward a second position to jack, up the moving module.
Figure 11:
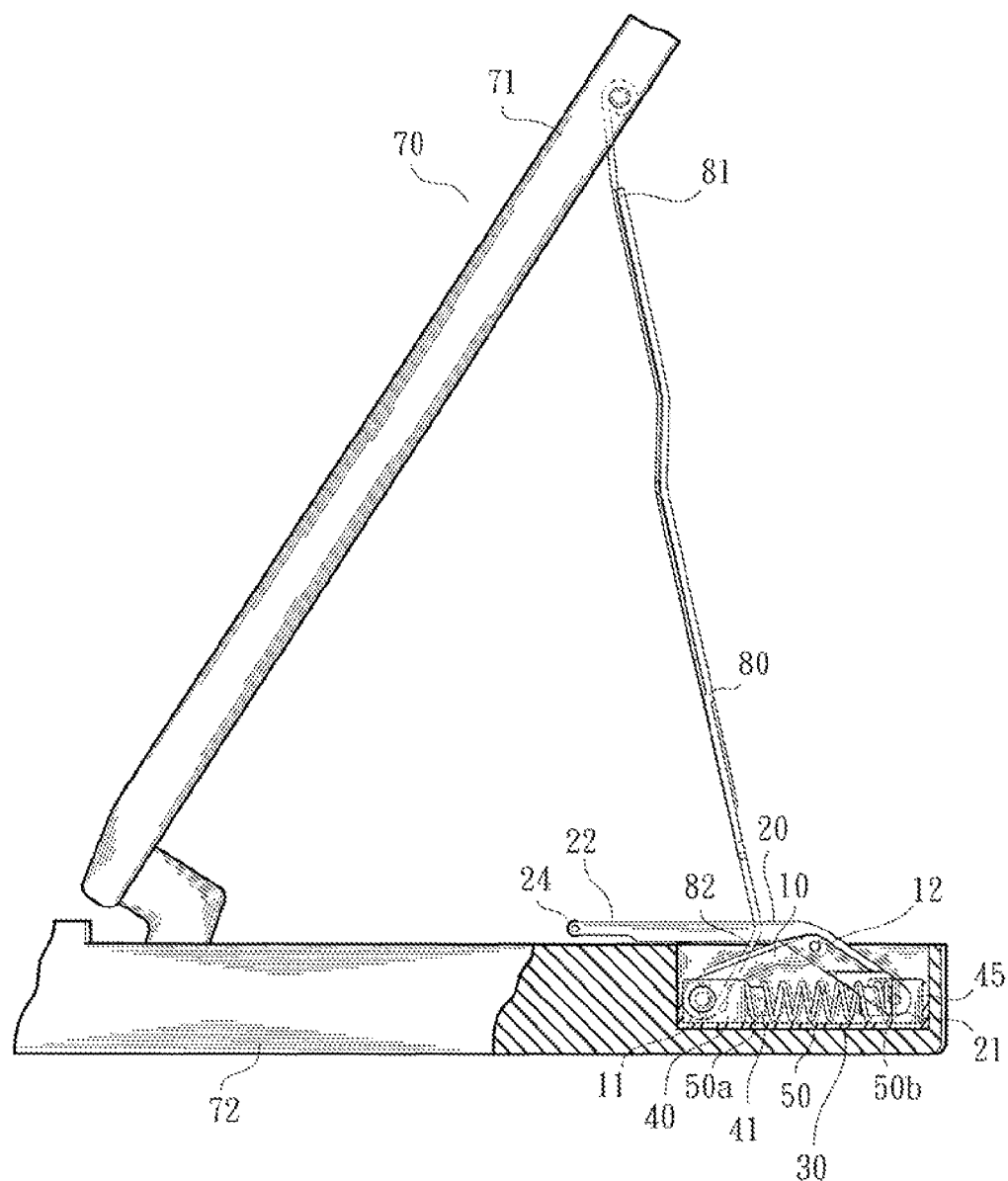
FIG. 11 is a schematic view of another operative embodiment of the present invention which is assembled with and applied to the machine body, illustrating a condition that the moving module is moved to a setting position as well as the moving module supported by the support arm is provided for user operations.

Referring to FIGS. 10 and 11, when an operator pushes the moving module 71 to motion rightward (on the paper sheets of FIGS. 10 and 11) along the groove track 74, the second end 82 of the support arm 80 exerts an action force to push the first end 11 of the slave arm 10 and the slide portion 40 to force the elastic device 50 to store energy therein. At the moment, the second end 12 of the slave arm 10 drives the link arm 20 to motion toward the second position, enabling the free end 22 of the link arm 20 to jack up the moving module 71. It is accordingly contributive to reduce horizontal thrust force, thereby attaining labor-saving effect and facilitating the operator to successively push the moving module 71.

Referring again to FIG. 10, with the rotation and upward movement of the moving module 71, the moving module 71 gradually leaves from the free end 22 of the link arm 20, and the action force from the support arm 80 to be exerted on the first end 11 of the slave arm 10 is gradually reduced. Accordingly, the elastic device 50 gradually releases the stored energy therefrom so as to drive the slave arm 10 and the link arm 20 back to their initial position (e.g., the condition illustrated by imaginary lines in FIG. 10).

FIG. 11 particularly illustrates a condition that the moving module 71 is moved to a setting position as well as the moving module 71 supported by the support arm 80 is provided for user operations.

In a derivate embodiment, if a constant force spring (not shown in FIG. 10) is further provided to be assembled between the moving module 71 and the system module 72, the moving module 71 can be constantly pulled rightward (on the paper sheet of FIG. 11) or a position for opening by the constant force spring. When the operator pushes the moving module 71 to drive the link arm 20 to jack up the moving module 71, the constant force spring can assist in pulling the moving module 71, thereby enabling the moving module 71 to generate an automatic spring open with a labor-saving effect.

Representatively speaking, under the term of the jacking device capable of lifting or lowering the object, the present invention provides the following considerations and advantages, compared to conventional skills.

Firstly, the structure and usage condition of the slave arm 10, the link arm 20 and components connected therewith have been redesigned and reconsidered, capable of providing innovated use pattern to be distinguished from conventional skills. For example, a motion pattern is provided that the slave arm 10 is shifted along the reference axis x to push the link arm 20 from the first position toward the second position when the slave arm 10 is received with an action force, or to drive the slave arm 10 and the link arm 20 hack to their initial position by cooperating with the elastic device 50 and 55.

Secondly, in comparison with conventional skills, the jacking device of the present invention is designed with a simplified structure assembly, capable of improving complicate structure and operation in conventional skills.

Thirdly, the structure design of the jacking device of the present invention can be served as an auxiliary device to be assembled with and applied to the machine body 70 (e.g., an electric apparatus), thus to assist the movement of the machine body 70. It is actually that the conditions of conventional skills which are incapable of being assembled with and applied to other objects or machine bodies can be improved accordingly.

In conclusion, the jacking device of the present invention effectively provides a unique spatial pattern different from conventional skills and incomparable advantages and inventiveness.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:
1. A jacking device, comprising:
 a combination of a slave arm and a link arm, wherein the slave arm and the link arm are operatively connected with a machine body, said machine body comprising a system module and a moving module displaceable relative to said system module, and a support arm disposed between the moving module and the system module, said support arm comprising a first end rotatably pivoted on the moving module and a second end rotatably pivoted on the system module, wherein the slave arm comprises a first end and a second end, said second end of the slave arm being pivoted to the link arm, wherein the link arm comprises a fixation end spaced from the moving module and a free end operatively coupled to said moving module, and wherein the second end of said support arm is operatively coupled to said first end of said slave arm to apply an external force thereto in a direction towards said fixation end of said link arm, wherein upon application of said external force, said first end of said slave arm is displaced by said external force towards said fixation end of said link arm, causing said second end of the slave arm to move the link arm, resulting in said moving module displacement by the free end of the link arm motioned between a first position and a second position.

2. The jacking device as claimed in claim 1, wherein the first end of the slave arm is shifted along a reference axis.

3. The jacking device as claimed in claim 1, wherein the second end of the slave arm is rotatably pivoted at a position located between the fixation end and the free end of the link arm.

4. The jacking device as claimed in claim 1, wherein a distance from a pivot position of the second end of the slave arm and the link arm to the fixation end of the link arm is shorter than a length of the link arm.

5. The jacking device as claimed in claim 1, wherein a distance from a pivot position of the second end of the slave arm and the link arm to the fixation end of the link arm is one-third of a length of the link arm.

6. The jacking device as claimed in claim 1, wherein the first end of the slave arm and the fixation end of the link arm are disposed on a base.

7. The jacking device as claimed in claim 6, wherein the base is configured with a rail along which the first end of the slave arm is motioned.

8. The jacking device as claimed in claim 7, wherein the base and the rail are arranged on a system module.

9. The jacking device as claimed in claim 6, wherein the base is configured with a pair of symmetrically disposed rails.

10. The jacking device as claimed in claim 6, wherein the base is arranged on a system module.

11. The jacking device as claimed in claim 1, wherein the first end of the slave arm is rotatably disposed on a slide portion.

12. The jacking device as claimed in claim 11, wherein the slide portion is freely movably installed on a base which is configured with a rail, and the slide portion is installed in the rail.

13. The jacking device as claimed in claim 12, wherein the base is configured with a pair of symmetrically disposed rails.

14. The jacking device as claimed in claim 1, further comprising another slave arm and a connecting portion connected between the two slave arms, so that the two slave arms are symmetrically disposed with respect to the connecting portion.

15. The jacking device as claimed in claim 1, further comprising another link arm and a connecting portion connected between the two link arms, so that the two link arms are symmetrically disposed with respect to the connecting portion.

16. The jacking device as claimed in claim 1, wherein an elastic device is configured between the first end of the slave arm and the fixation end of the link arm.

17. The jacking device as claimed in claim 16, wherein the elastic device is formed by a helical spring, comprising two ends respectively fixed at positions which are located between the first end of the slave arm and the fixation end of the link arm.

18. The jacking device as claimed in claim 17, wherein the first end of the slave arm is pivoted to a slide portion provided with a head end, the fixation end of the link arm is configured with a fixation portion provided with a head end thereon, and the two ends of the elastic device are respectively fixed on the head end of the slide portion and the head end of the fixation portion.

19. The jacking device as claimed in claim 1, wherein the slave arm is formed by a laminate article.

20. The jacking device as claimed in claim 1, wherein the slave arm is formed by a laminate article.

21. The jacking device as claimed in claim 1, wherein the free end of the link arm is configured with a roller.

22. The jacking device as claimed in claim 1, wherein an elastic device is configured at a pivot position of the second end of the slave arm and the link arm, and the elastic device includes two ends respectively fixed on the second end of the slave arm and the link arm.

23. The jacking device as claimed in claim 22, wherein the elastic device is formed by a torsion spring.

24. The jacking device as claimed in claim 1, wherein an elastic device is configured at a position located between the first end of the slave arm and a slide portion.

25. The jacking device as claimed in claim 1, wherein an elastic device is configured at a position located between the fixation end of the link arm and a fixation portion.

26. The jacking device as claimed in claim 1, wherein an elastic device is configured at a position located between the fixation end of the link arm and a base.

27. The jacking device as claimed in claim 1, wherein the machine body is formed by an electric apparatus which comprises said moving module, and wherein said system module is provided with a keyboard zone.

28. The jacking device as claimed in claim 27, wherein the moving module is a display screen.

29. The jacking device as claimed in claim 27, wherein the moving module is motioned along a groove track disposed on the system module.

30. The jacking device as claimed in claim 1, wherein the first end of the support arm is pivoted to a side region of the moving module.

31. The jacking device as claimed in claim 1, wherein the second end of the support arm is coupled to the first end of the slave arm.

32. The jacking device as claimed in claim 1, wherein the second end of the support arm is coupled to the first end of the slave arm by a coaxial pivot connection.

33. The jacking device as claimed in claim 1, wherein a constant force spring is assembled between the moving module and the system module.

* * * * *